United States Patent

Ongkiehong

[15] 3,636,463

[45] Jan. 18, 1972

[54] METHOD OF AND MEANS FOR GAIN-RANGING AMPLIFICATION

[72] Inventor: Leo Ongkiehong, Rijswijk, Netherlands

[73] Assignee: Shell Oil Company, New York, N.Y.

[22] Filed: Dec. 12, 1969

[21] Appl. No.: 884,429

[52] U.S. Cl. ..... 330/29, 330/110, 330/151, 340/15.5 GC

[51] Int. Cl. ..... H03g 3/30

[58] Field of Search ..... 330/29, 86, 110, 124, 127, 330/129, 151; 340/15.5 GC

[56] References Cited

UNITED STATES PATENTS

| | | | |
|---|---|---|---|
| 3,241,100 | 3/1966 | Loofbourrow | 340/15.5 |
| 3,315,223 | 4/1967 | Hibbard et al. | 340/15.5 |
| 3,440,557 | 4/1969 | Sundeen | 330/110 X |
| 3,469,202 | 9/1969 | Priddy | 330/151 X |
| 3,525,948 | 8/1970 | Shorer et al. | 330/110 X |

*Primary Examiner*—Roy Lake
*Assistant Examiner*—James B. Mullins
*Attorney*—J. H. McCarthy and Theodore E. Bieber

[57] ABSTRACT

A gain-ranging amplifier is disclosed comprising a plurality of fixed gain amplifier stages connected in cascade and means for taking the output signal from any one of the fixed gain amplifier stages. Control means are described whereby such output signal is taken from the amplifier stage immediately preceding the first such stage which is being overdriven at a particular point in time by the signal which is being amplified. Specific circuits are disclosed for use in seismic geophysical exploration applications and means for generating a signal representative of the amount of gain utilized in amplifying the input signal and for monitoring the input signal are described.

19 Claims, 7 Drawing Figures

INVENTOR.
LEO ONGKIEHONG

BY

McClain, Moore & Weissenberger
ATTORNEYS

INVENTOR.
LEO ONGKIEHONG
BY
Mellin, Moore & Weissenberger
ATTORNEYS

INVENTOR.
LEO ONGKIEHONG

BY Mellin, Moore & Weissenberger

ATTORNEYS

INVENTOR.
LEO ONGKIEHONG

BY

Mellin, Moore & Weissenberger
ATTORNEYS

METHOD OF AND MEANS FOR GAIN-RANGING AMPLIFICATION

BACKGROUND OF THE INVENTION

This invention relates to the amplification of electrical signals which vary over a wide range in intensity and more particularly to a method of and means for amplifying such signals by varying the amount of amplification (i.e., gain) inversely with respect to the signal intensity in order to provide a constant output intensity range and an auxiliary output representative of the gain variation, whereby an amplified output signal accurately representing the input signal may be produced.

It is impossible to design a high-gain electrical signal amplifier which is capable of amplifying with fidelity a signal which varies over a wide range of intensity. If the amplifier is made sensitive enough to provide sufficient gain to amplify the lowest intensity portion of the signal to a usable level, it will be overdriven by the high-intensity portion of the signal and will produce a distorted output. If the gain of the amplifier is reduced to enable it to amplify the high-intensity portion of the signal without distortion, it will be insensitive to the lower intensities of the signal.

According to the prior art this problem has been met by designing amplifier circuits to include means for varying the characteristic gain thereof inversely with respect to the input signal. Such means have included, for example, a variable impedance or a variable bias in the amplifier circuit itself. However, such means inherently introduce undesirable changes in the characteristics of the amplifier and distortion in amplification of the signal. Faithful amplification of an electrical signal requires carefully constructed circuitry in which the components are matched to each other and operating voltages are closely controlled. The introduction of variable impedances and voltages into such circuitry necessarily results in uncertainty as to impedance values and voltage values and the careful balance of the circuitry is necessarily destroyed. Furthermore, such circuits are limited in the speed with which they can respond to variations in intensity of the input signal due to inherent resistance/capacitance time constants present in the amplifying circuit itself. Thus, rapid increases and decreases in signal intensity will result in distortion of the output signal during the time required for the gain controlled amplifier to adjust to the new intensity level of the input signal.

It is an object of this invention to provide a method of and means for providing a constant output intensity range regardless of the intensity of the input signal and without varying the gain characteristics of the signal amplifier circuits which are utilized.

The method and means of this invention are particularly suited for use in systems involving the recording of a low-level electrical signal of widely varying intensity for subsequent reproduction. All recording mediums require that a certain minimum signal intensity be applied in order to produce an accurate and reliable record. Furthermore, if the applied signal intensity exceeds a certain maximum level for a given recording device it will exceed the ability of the device to make an accurate and reliable record thereof. Generally speaking, such minimum and maximum limits are not sharply defined for a given recording medium. Instead, the recording medium performs optimumly for a given input signal intensity range and becomes progressively less accurate and reliable as the signal intensity rises above or falls below such optimum input signal intensity range. Thus, the low-level signal must be amplified toward the optimum recording range and some sort of gain control must be used in order to avoid also amplifying the variations in signal intensity which would cause portions of the signal to fall below the minimum or exceed the maximum capabilities of the recording medium. In addition to the disadvantages heretofore discussed, prior art methods of gain control have not provided a conveniently recordable output corresponding to the gain variations required to amplify the input signal for recording. It will be understood that in order to accurately reproduce the input signal it is necessary to restore the wide variation in intensity when the recorded signal is played back from the recording medium.

Thus, it is a further object of this invention to provide a method of and means for providing a constant signal to a recording means regardless of the intensity of the input signal, together with an appropriate auxiliary output representative of the gain variation involved, whereby a signal accurately representing the input signal may be reproduced from the recording medium.

This invention will be specifically described hereinafter with respect to its application to seismic apparatus for use in geophysical prospecting. However, it will be understood that this invention may be used in many other applications. In a copending application entitled "Recording System for Seismic Signals," filed on Oct. 20, 1969, Ser. No. 867,523 and assigned to the same assignee as this invention, seismic apparatus is disclosed in which the analog electrical signal produced by each geophone of the system in response to a seismic disturbance is amplified and applied to an analog-to-digital converter. The digital output of the analog-to-digital converter is then recorded for use in reconstructing the input signal or for further processing. Since the seismic signals of importance received by the geophones will vary widely in intensity (over an 80 db. range, for example), it is desirable to use a gain ranging amplifier in order to reduce the design requirements for a practical analog-to-digital converter for use in the system. It is necessary that the gain-ranging amplifier be capable of responding to either increasing or decreasing intensity variations as quickly as possible. A gain-ranging amplifier in accordance with this invention is capable of responding to either increasing or decreasing intensity an order of magnitude faster than could prior art gain-ranging amplifiers. For example, a response time of about 5 microseconds can be achieved according to the teaching of this invention.

Seismic systems for geophysical prospecting utilize a large number of geophones spaced from each other along the surface of the earth about a point at which a seismic disturbance is to be introduced for reflection by various earth strata and subsequent detection by the geophones. The placement of the geophones of the system requires a substantial investment in time and effort since they are often spread over a large area. In fact, at least some of the geophones are usually out of sight of the control point at which the seismic disturbance is initiated. It will also be understood that such seismic geophysical explorations are often conducted in inhabited areas and that any localized disturbances that may occur immediately adjacent one or more of the geophones after the seismic disturbance has occurred and during the time when reflections are being received by the geophones will introduce errors into the system and may require that the "shot" be repeated. Such localized disturbance might be caused, for example, by a man or an animal walking close to a geophone so that the geophone picks up the signals resulting from their footfalls. Not only would such signals be extraneous signals, so far as the system is concerned, but they will tend to cause the gain of the associated gain-ranging amplifier to adjust to their intensity which may be either larger or smaller than the intensity of the desired signals when they occur. In either case the gain of the gain-ranging amplifier will be improper for the intensity of the desired signal which will result in distortion thereof so long as the extraneous signals persist.

This invention provides a monitoring output signal by which localized seismic conditions at each of the geophones may be checked prior to initiating the seismic disturbance. Thus, it is another object of this invention to provide a gain-ranging amplifier which is capable of providing auxiliary output signal suitable for monitoring which is distinct from the actual signal being amplified and which is provided through a separate channel.

BRIEF DESCRIPTION OF THE DRAWINGS

These and other objects and features of this invention will be more fully understood from the following detailed description of a preferred embodiment thereof when taken in conjunction with the attached drawings in which.

PREFERRED EMBODIMENT

Figure 1:
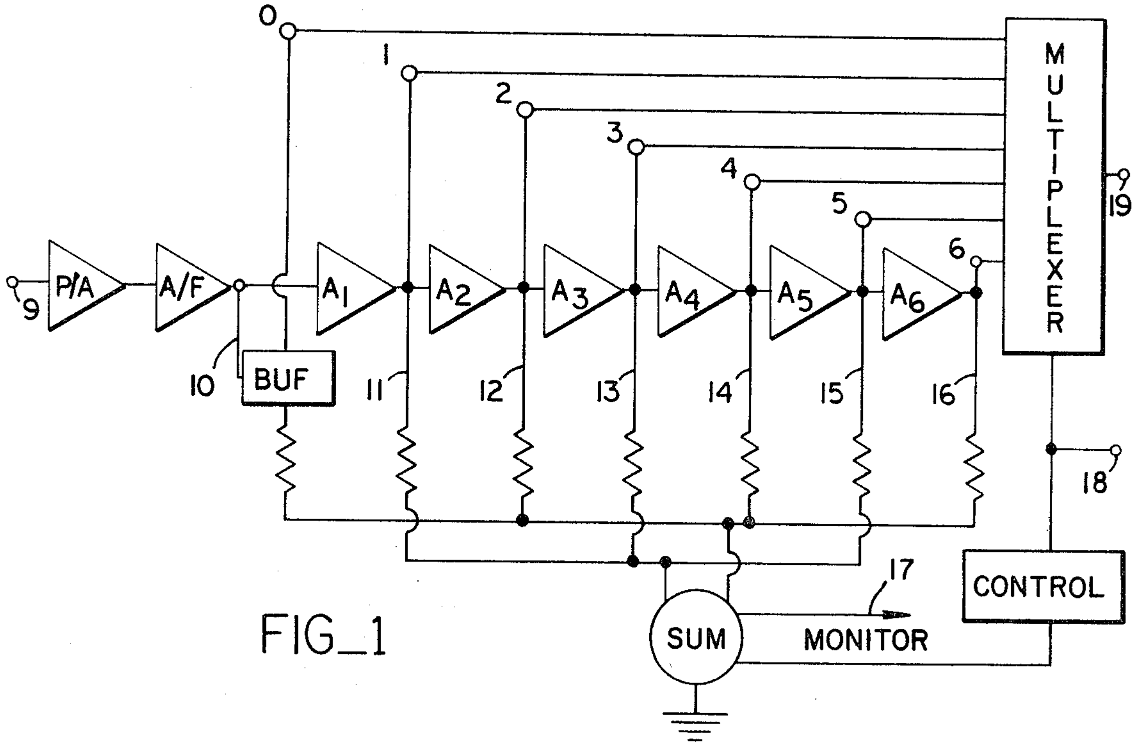
FIG. 1 is a block diagram of a gain-ranging amplifier according to this invention.

Referring to FIG. 1 the gain-ranging amplifier according to this invention comprises a plurality of amplifier stages $A_1$–$A_6$ connected in cascade. Each of such amplifier stages $A_1$–$A_6$ is designed to provide a certain fixed amount of gain, for example 12 db. (i.e., a four times increase in voltage or current amplitude). In addition, a preamplifier stage (P/A) is interposed between the signal source 9 and the input to the first amplifier stage $A_1$. The preamplifier stage (P/A) is designed for the maximum gain consistent with distortionless amplification of the full intensity range of the input signal. For example the preamplifier (P/A) may be designed to give a gain of 24 db. or a 16 times increase in the voltage amplitude of the signal at the signal source 9.

As shown in FIG. 1 each of the amplifier stages $A_1$ through $A_5$ have three outputs, one of which is connected to the input of the next succeeding amplifier stage and another of which 1–5 is connected to a multiplexer. Amplifier stage $A_6$, being the last of the stages in the amplifier chain, has only two outputs one of which 6 is connected to the multiplexer. The third output of amplifier stages $A_1$ through $A_5$ and the second output of amplifier stage $A_6$ will be more fully discussed hereinafter.

As shown in FIG. 1 an "alias filter" (A/F) is interposed between the preamplifier (P/A) and the input to the first amplifier stage $A_1$. Such alias filter (A/F) is not essential to this invention in its simplest form but is required to adapt the invention for use in seismic geophysical prospecting where its function is to select the frequency of the signal to be amplified for monitoring, digitizing, and recording. Such frequency is usually quite low, as of the order of 125 cycles per second, and the passband of the alias filter may cover a range of 250 cycles per second, for example. Thus, in describing the operation of this invention hereinafter, the signal to be amplified is represented as a simple sine wave although a signal having a much more complicated waveform may be handled by the method and means of this invention.

As shown in FIG. 1, the alias filter has two outputs, one of which serves as the input to amplifier stage $A_1$. It will be understood that if no alias filter (A/F) is used, such outputs would be taken directly from the preamplifier (P/A). According to this invention the other output 10 of the preamplifier (or alias filter) is used to control the operation of the multiplexer in response to the intensity of the input signal to cause it to select the output 1–6 of amplifier stages $A_1$–$A_6$ at which the amplified signal appears without distortion. According to the simplest embodiment of this invention such control may be accomplished by a comparator circuit, for example, in which the amplitude of the voltage swing of the output 10 of the preamplifier (or alias filter) is compared to selected voltage standards to generate the required control signal for the multiplexer. In addition, this output 10 of the preamplifier (or alias filter) may be used to provide a further input 0 to the multiplexer. As shown in FIG. 1 a buffer circuit (BUF) may be used in the circuit of this output 10 of the preamplifier (or alias filter) to isolate the input to amplifier stage $A_1$ from the control circuit and from the multiplexer.

Thus, in operation, a vary high-intensity input signal at 9 will be amplified by the preamplifier to an amplitude which when coupled through output 10 and an appropriate control circuit will cause the multiplexer to select input 0 thereto corresponding to the output 10 of the preamplifier (or alias filter) and none of the amplifier stages $A_1$–$A_6$ will be utilized in providing the amplifier output signal which appears at the output 19 of the multiplexer. On the other hand, a very low-intensity input signal at 9 when amplified by the preamplifier and applied to the control circuit through output 10 will cause the multiplexer to select input 6 thereto which corresponds to the output of amplifier stage $A_6$ and all of the amplifier stages $A_1$–$A_6$ will be utilized in providing the amplified output signal at output 19 of the multiplexer. Similarly, input signals of intermediate intensity at input 9 when amplified by the preamplifier and applied to the control circuit will cause the multiplexer to select the one of inputs 1–5 corresponding to the one of amplifier stages $A_1$– $A_5$ which is providing undistorted amplification at such intermediate input signal intensity for output at 19.

It will be seen that, according to this invention, the gain characteristics of the preamplifier and the amplifier stages $A_1$–$A_6$ are not altered in operation. Thus, the sole limitation on the speed at which the amplifier, as a whole, can respond to a change in the intensity of the signal at input 9 is imposed by the speed at which the control circuit and multiplexer can respond to such change in intensity. Such control circuits and multiplexers are commercially available having response times as low as 5 microseconds and thus their specific construction does not form a part of this invention other than in combination with the other elements of the gain-ranging amplifier of this invention. As mentioned above the response time of the gain-ranging amplifier of this invention is an order of magnitude faster than that of gain-ranging amplifiers of the prior art. Therefore, the elements of this invention thus far described will accomplish one of the objects thereof, namely a much more rapid response to changes in the intensity of the input signal than was possible according to the prior art.

However, it will be understood that the amplified signal appearing at output 10 of the preamplifier (or alias filter) will vary even more widely in intensity than does the input signal, due to the gain of the preamplifier. This wide variation in intensity would impose severe requirements on the control circuit but for a further feature of this invention. As shown in FIG. 1 a third output 11–16 from each of the amplifier stages is provided. These outputs are combined with each other and with the output 10 of the preamplifier (or alias filter) in a summing circuit which will be more fully described hereinafter and which is indicated in FIG. 1 by the label SUM. The output of such summing circuit may be used to activate the control circuit as indicated in FIG. 1.

It will be understood that, regardless of its intensity, the input signal is being amplified by all the amplifier stages $A_1$–$A_6$ at all times during operation. However, the output of all amplifier stages (e.g., $A_4$–$A_6$) subsequent to the one (e.g., $A_3$) the output of which has been selected through the operation of the control and multiplexer circuits will be distorted and of no effect in the providing of the amplified signal at output 19 of the multiplexer. Thus, the preamplifier and each of the amplifier stages $A_1$–$A_6$ may include output limiting components in their respective output circuits (not shown in FIG. 1 but which will be more fully described in connection with FIG. 4). Such output limiting components will, of course, add to the distortion present in the output of the preamplifier (P/A) and amplifier stages $A_1$–$A_6$ when they are overdriven, however, they will also cause the sum or combined signals of the third outputs 10–16 to vary between zero (when no input signal is present) and a certain maximum amplitude fixed by such limiting components (when the input signal has an amplitude sufficient to overdrive the preamplifier as well as all of the amplifier stages $A_1$–$A_{6a}$).

The use of such limiting components will further decrease the requirements imposed on the control circuit (which may include an analog to digital converter rather than a simple voltage comparator circuit) since such circuit will only be required to operate when its input is higher than the overdriven output of the last amplifier stage $A_6$ and lower than the total (or sum) of the overdriven outputs of the preamplifier (P/A) and all of the amplifier stages $A_1$–$A_6$. It will be understood that the operation of the control circuit and multiplexer will be such that the output of the preamplifier P/A (or alias filter A/F) will be selected to provide the signal to multiplexer output 19 unless and until the input signal at 9 decreases in amplitude to a value less than that required to overdrive the first amplifier stage $A_1$ as well as all succeeding amplifier stages $A_2$–$A_6$. At that point the output of amplifier stage $A_1$ will be selected to provide the signal at output 19 until amplifier stage $A_2$ ceases to be overdriven. The output of amplifier stage $A_2$ will then be selected and so on until the input signal at 9 finally falls below that required to overdrive amplifier stage $A_6$ from which point on the signal at multiplexer output 19 will continue to be supplied by amplifier $A_6$ until it falls below the levels which can be utilized by the recording or digitizing device coupled to output 19 and the operation is ended.

It will be understood that the output of the control device may be coupled out as indicated at 18 and recorded or otherwise utilized in order to provide a signal representative of the gain variations involved in amplifying the input signal of the gain variations involved in amplifying the input signal so that the input signal may be reconstructed with accuracy. Furthermore, the sum of the outputs of the limiting circuits associated with the preamplifier P/A and amplifier stages $A_1$–$A_6$ may be utilized to provide an output suitable for driving a display device as indicated at 17, for example, in order to provide a means for monitoring the operation of the device without interference with the primary signal channel.

Figure 2:
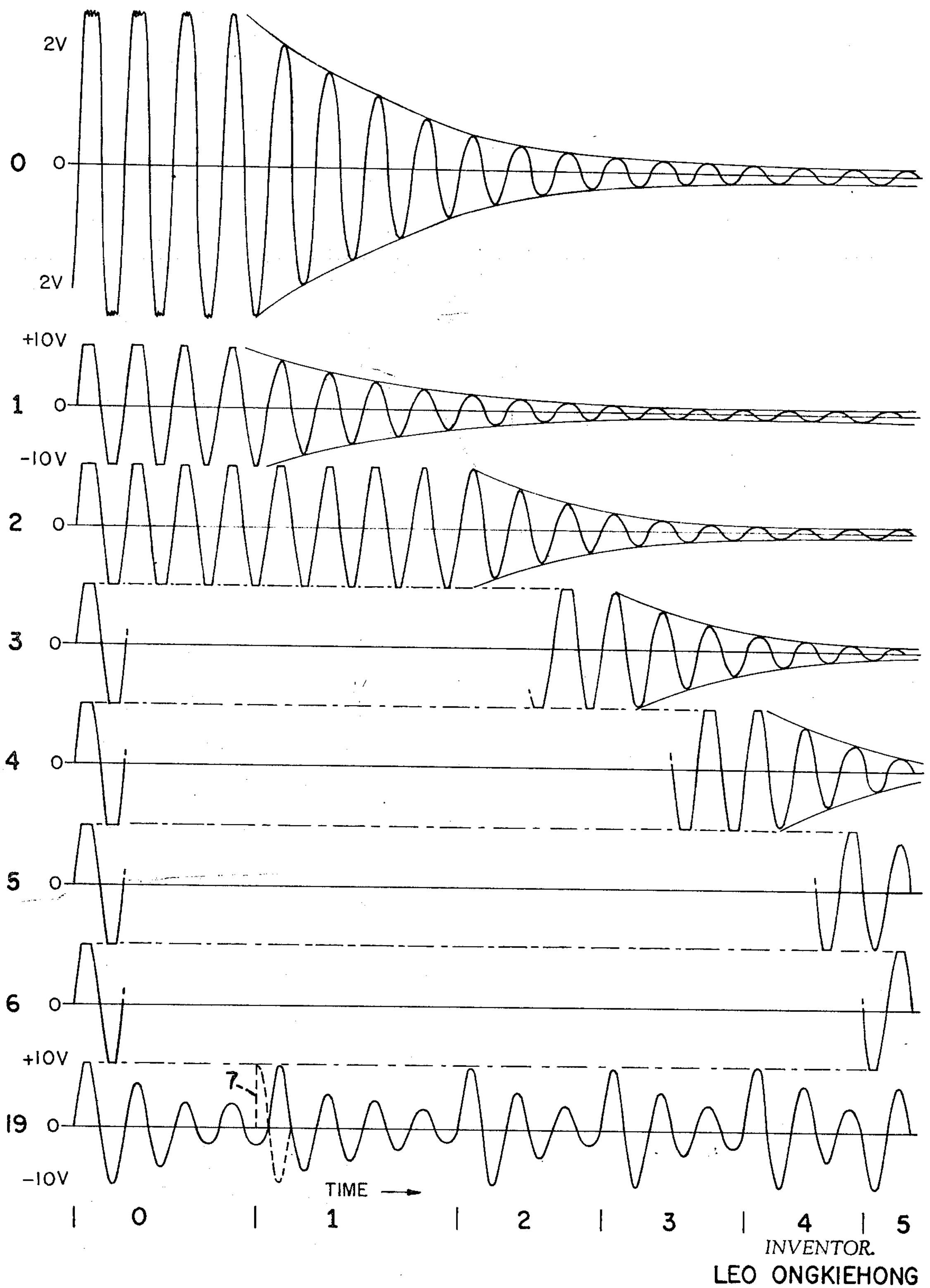
FIG. 2 is a series of waveforms representing the signal present at various points in the block diagram of FIG. 1 under operating conditions.

The operation of the primary signal channel will be more fully understood by reference to FIG. 2 wherein the voltage waveform present at various points in the block diagram of FIG. 1 are represented. The waveforms of FIG. 2 are based on the assumptions that a signal is present at input 9 which decreases exponentially with time from a maximum of about 1 volt toward zero and that an output at 19 ranging between about 2.5 volts and 10 volts is desired for digitization or recording, etc. For ease of depiction the waveform at output 0 of FIG. 1 has been shown with an amplitude scale that is five times greater than the amplitude scale for the waveforms at outputs 1–6 of FIG. 1. However, the time scale is the same for all of the waveforms. Also for ease of depiction and comparison the 180° phase shift which actually occurs from one amplifier stage to the next according to the specific embodiment described hereinafter has been ignored. Such phase shift only results in a much more pronounced (i.e., sharper) change in the waveform at the multiplexer output 19 as the transition is made from the output of one amplifier stage to the next as shown by the dotted line 7 in FIG. 2.

As shown in FIG. 2, a signal having an amplitude of 1 volt or more at input 9 will overdrive the preamplifier and all of the amplifier stages $A_1$–$A_6$. In other words, a preamplifier gain of 24 db. or a 16 times increase in voltage amplitude would result in a signal at preamplifier output 0 having an amplitude of 16 volts, but for the action of the limiter circuit associated with the preamplifier which distorts the waveform of the signal toward a square wave having an amplitude of 10 volts. This is not shown in the waveform for output 0 due to scale limitations, but is indicated in the first half cycle of the waveform for multiplexer output 19. Similarly, each of the amplifier stages $A_1$–$A_6$ will be overdriven and due to the limiter circuits associated therewith the waveforms appearing at outputs 1–6 will approach square waves having amplitudes of 10 volts, as indicated. When the signal at input 9 drops below 0.625 volt the preamplifier will cease to be overdriven (i.e., its output will be less than 10 volts) and the waveform at output 0 and at the multiplexer output 19 will be a faithful representation of the input signal amplified by a gain of 16. Since the gain of each of the amplifier stages $A_1$–$A_6$ is 12 db. or a four times increase in voltage amplitude, according to this embodiment of the invention, all of them will continue to be overdriven until the signal at input 9 falls below about 0.156 volts, at which point the output of the preamplifier will fall below 2.5 volts and amplifier stage $A_1$ will cease to be overdriven. At this point the control circuit will cause the multiplexer to switch from output 0 of the preamplifier to output 1 of amplifier stage $A_1$, and the signal at multiplexer output 19 will immediately increase to correspond to the signal at output 1. The above described cycle of operation will be repeated as the signal at input 9 continues to decrease and outputs 2–6 will each be selected in turn by the control circuit and multiplexer as the output of the preceding amplifier stage falls below 2.5 volts as indicated in FIG. 2. Thus, it will be seen that the signal appearing at multiplexer output 19 will vary in amplitude between 2.5 and 10 volts until the signal at input 9 has fallen below about 40 microvolts, at which point, not shown in FIG. 2, the signal at output 6 of amplifier stage $A_6$ will fall below 2.5 volts and will continue to decay toward zero with the input signal, but amplified by the full gain of the preamplifier and all of the amplifier stages $A_1$–$A_6$.

It will be understood that if the signal at input 9 were to increase, the operation described above would take place in reverse so that the signal at multiplexer output 19 would be maintained in the range between 2.5 volts and 10 volts. As pointed out above, control circuits and multiplexer circuits are available which have a response time of the order of 5 microseconds. If the frequency of the signal being amplified is 125 cycles per second, for example, then 5 microseconds would represent a very small fraction of the time required for one cycle of such signal and very little distortion would result from the operation of the multiplexer and control circuits.

Figure 3:
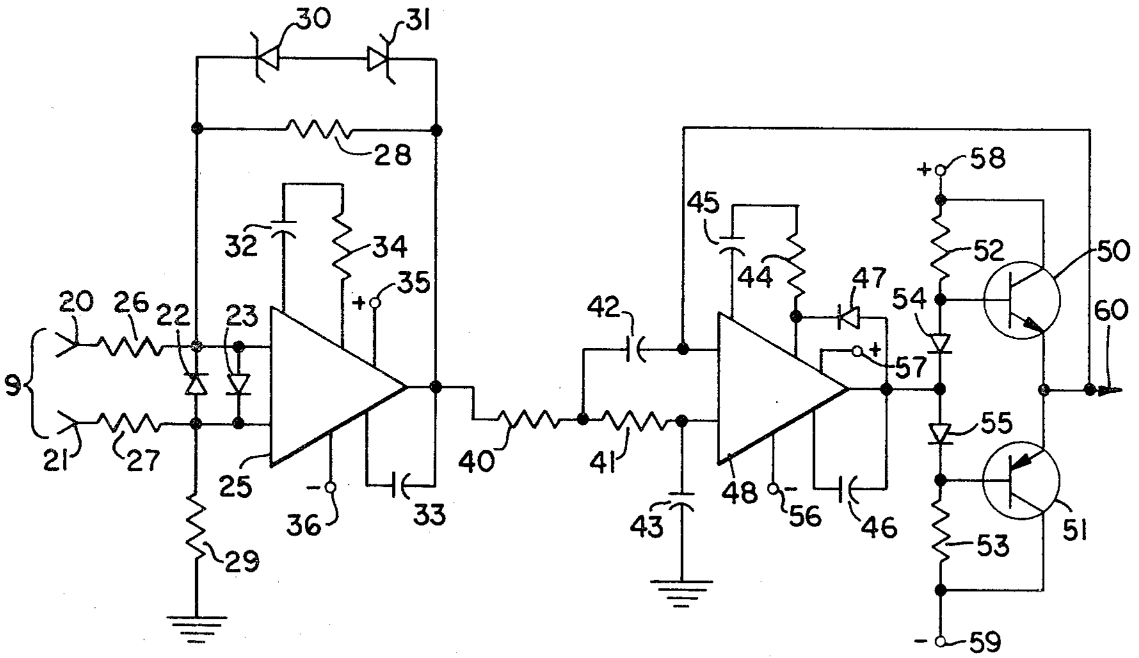
FIG. 3 is a schematic representation of a preamplifier and an alias filter suitable for use in the embodiment of this invention represented by the block diagram of FIG. 1.

Referring to FIG. 3, a schematic diagram of a specific preamplifier (P/A) and alias filter (A/F) suitable for use according to one embodiment of this invention is shown. Since this embodiment of the invention is specifically adapted for use in seismic geophysical exploration equipment the input 9 is actually a differential input comprising high-input 20 and low-input 21. It will be understood that the input to the preamplifier will come from a geophone through a pair of twisted lines operating above ground and terminating in inputs 20 and 21. Since the geophone may be located at some distance from the preamplifier and since the leads therefrom will be exposed to the elements there is the possibility that high-voltage transients will be developed on such leads. Therefore the preamplifier is protected against high-voltage transients up to 6,000 volts by diodes 22 and 23 which are connected in parallel across the input line in opposite polarity to each other. The basic element of the preamplifier is a so-called operational amplifier 25. Such operational amplifier 25 may be any commercially available device such as is sold under the designation MC 1709 CG. The same operational amplifier is also used in the alias filter and in the buffer, amplifying stages and summing stages to be described hereinafter. The stage gain of the operational amplifier 25 in the preamplifier circuit is limited to 24 db. or 16 times amplification by resistors 26, 27, 28 and 29. The output of the preamplifier is limited to 10 volts maximum, for the reasons set forth above, by Zener diodes 30 and 31. Zener diodes 30 and 31 are selected to provide fast overload recovery of the preamplifier in the event that the preamplifier is overdriven. Capacitors 32 and 33 and resistor 34 are included in the circuit to reduce the high-frequency response of the preamplifier and therefore stabilize its operation. DC inputs 35 and 36 provide the input power for the preamplifier from a power supply not shown. The output of the preamplifier is coupled to the alias filter through resistors 40 and 41 which together with capacitors 42 and 43 determine the frequency which will pass through the alias filter. They also set the operation of the alias filter in a noninverting mode to avoid the 180° phase shift which would otherwise occur. It will be understood that the alias filter operates at unity gain, its sole function being to pass a very narrow band of frequencies. Resistor 44 together with capacitor 45 and capacitor 46 control the high-frequency response of the alias filter. The diode 47 protects the operational amplifier 48 in the event that the signal from the preamplifier should exceed the prescribed limit. Transistors 50 and 51 along with resistors 52 and 53 and diodes 54 and 55 reduce the output impedance of the operational amplifier 48 to a value which makes it possible to drive the alias filter to full output with low distortion (i.e., less than 0.01 percent). DC inputs 56, 57, 58 and 59 provide power for the operation of the alias filter from a power supply not shown. The output of the alias filter is taken at 60 and may be passed through additional alias filter stages in order to provide a sufficiently narrow band signal for further amplification. Such additional alias filter stages would be identical to that described above and may be provided with means for introducing additional resistance into the alias filter circuits in order to control the passband thereof. According to one embodiment of this invention an alias filter comprising 6 stages was used. A three-position cutoff frequency selection switch was included providing a cutoff frequency of 62.5 Hertz in the first position, 125 Hertz in the second position, and 250 Hertz in the third position. In all positions the attenuation at twice the selected cutoff frequency was 72 db. The attenuation for all frequencies higher than three times the cutoff frequency was 90 db. or more.

Figure 4:
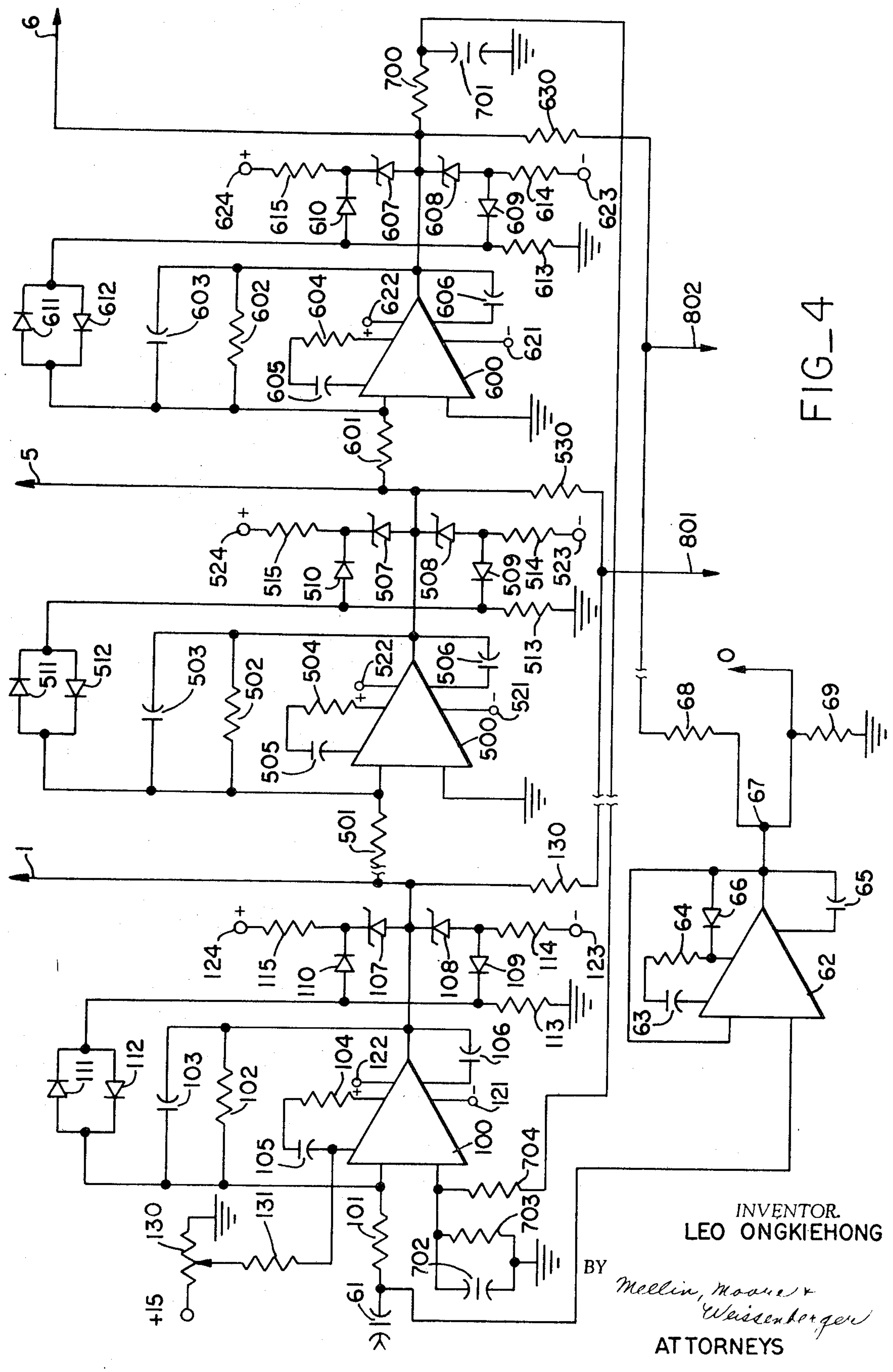
FIG. 4 is a schematic representation of amplifier stages suitable for use in the embodiment of this invention shown in the block diagram of FIG. 1.

The output 60 of the alias filter or chain of alias filter stages shown in FIG. 3 is connected to the input of the first amplifier stage and to the input of the buffer as indicated in FIG. 1 and shown in detail in FIG. 4.

Referring to FIG. 4, the output of the alias filter or alias filter stages is coupled through nonpolar capacitor 61 to the input of the operational amplifier 62 of the buffer stage and through input resistor 101, to the input of the operational amplifier 100 of the first amplifier stage. The buffer stage, which is connected to operate in the unity gain noninverting mode, is used to decouple the multiplexer and control circuit from the input to the amplifier stages. Capacitor 63, resistor 64 and capacitor 65, control the high-frequency response of the buffer. Diode 66 protects the operational amplifier 62 in the event of excess drive signal. Thus the signal appearing at the output 67 of the buffer stage is the filtered output of the preamplifier stage.

Except for gain-ranging amplifier stage $A_1$ all of the amplifier stages $A_2$–$A_6$ are identical. Considering gain-ranging stage $A_5$ as typical the following description of the operation of the gain-ranging amplifier stages is applicable to all of the stages. The operational amplifier 500 of gain-ranging amplifier stage $A_5$ is operated as an inverting amplifier stage with a gain of 12 db. or four times amplification. The gain of amplifier stage $A_5$ is set by the input resistor 501 and feedback resistor 502. The capacitor 503 in parallel with resistor 502 limits the circuit bandwidth and thus reduces the system noise level. The network consisting of resistor 504 and capacitors 505 and 506 reduce the high-frequency response of the amplifier stage $A_5$ and therefore stabilizes the performance of operational amplifier 500. The network consisting of Zener diodes 507 and 508, diodes 509, 510, 511, 512 and resistors 513, 514 and 515 limits the output of the amplifier to 10 volts for the reason set forth hereinabove. This network is designed to insure speedy overload recovery when the input signal drops to a level at which the output of the operational amplifier 500 becomes linear. This overload recovery network is capable of responding in less than 1 microsecond. The operation of the network is as follows: Considering an output signal increasing in the positive direction. When the signal reaches the breakdown voltage of Zener diode 508 the Zener diode begins to conduct more heavily through diode 509 into resistor 513. When the voltage drop across resistor 513 exceeds the forward threshold voltage of diode 512 such diode will begin to conduct thereby reducing the effective feedback to the input of operational amplifier 500. Without such feedback the operational amplifier 500 can no longer act as a voltage source and the output is clamped at the desired voltage. The operation for the negative going signal is substantially the same as that just described but involves Zener diode 507 and diodes 510 and 511. DC power for the operation of he amplifier stage is again provided through DC inputs indicated at 521, 522, 523 and 524 from a power supply not shown.

The first gain-ranging amplifier stage $A_1$ differs from the other five $A_2$–$A_6$ in that smaller input and feedback resistors 101 and 102 are used to reduce stage noise, but more importantly in that a zero DC offset adjustment is provided and a DC feedback signal from the output is provided to reduce the temperature drift of the overall amplifier to approximately 1 microvolt per degree centigrade. The DC offset adjustment is provided through variable resistor 130 having its adjustable tap connected through resistor 131 to the feedback circuit at the input to operational amplifier 100. The DC feedback signal is taken through resistor 700 and the network consisting of nonpolar capacitor 701, resistors 703 and 704 and nonpolar capacitor 702 and applied to the noninverting input of the operational amplifier 100.

It will be understood that in the simplest form of this invention the output of the buffer stage might be taken through resistor 68 and used to control the multiplexer to cause it to select the appropriate stage of the gain-ranging amplifier chain including the preamplifier P/A and amplifier stages $A_1$–$A_6$ in order to obtain an undistorted output. However, according to the teaching of this invention the operation of the gain-ranging amplifier may be made more reliable by taking an output from each of the amplifier stages $A_1$ through $A_6$ in addition to the output of the preamplifier and summing them together. Thus as shown in FIG. 4 an output from gain-ranging amplifier stage $A_1$ is taken through resistor 130. Similarly an output from gain-ranging amplifier stage $A_5$ is taken through resistor 530 and an output from gain-ranging amplifier stage $A_6$ is taken through resistor 630. Since the gain-ranging amplifier stages $A_1$ through $A_6$ are being operated in their inverting mode, according to the embodiment of the invention shown in FIG. 4, the outputs of the odd numbered stages will be 180° out of phase with the outputs of the even numbered stages and the output of the amplifier. Thus, as shown in FIG. 4, the output of stage $A_1$ through resistor 130 is connected to the output of amplifier stage $A_5$ taken through resistor 530 by a bus 801. It will be understood that the output of gain-ranging amplifier stage $A_3$ would also be connected to this bus 801. Similarly the output of the buffer stage taken through resistor 68 is connected to the output of gain-ranging amplifier stage $A_6$ which is taken through resistor 630 by a bus 802. It will be understood that outputs of gain-ranging amplifier stages 2 and 4 would also be connected to this bus 802.

Figures 5, 6, 7:
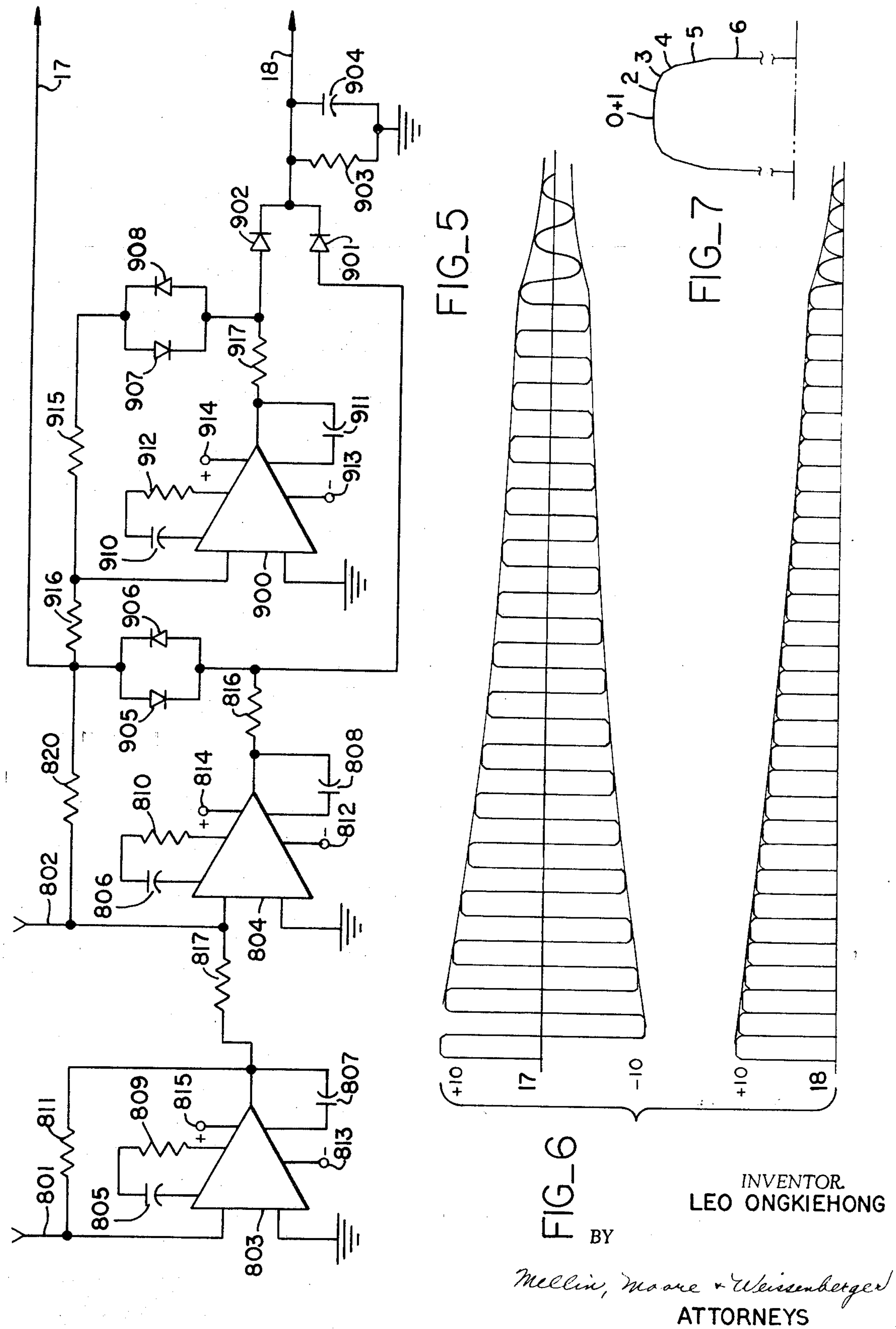
FIG. 5 is a schematic representation of a summing stage suitable for use in the embodiment of this invention shown in the block diagram of FIG. 1.
FIG. 6 is a series of waveforms representing the signal present at the monitor and control outputs of the block diagram of FIG. 1 and the schematic of FIG. 5.
FIG. 7 is an enlarged view of one half-cycle of the waveforms shown in FIG. 6.

The utilization of the signals from the odd bus 801 and the even bus 802 in the summing, control and monitor circuits will be more fully understood with reference to FIGS. 5, 6 and 7. Referring to FIG. 5 the output from the odd bus 801 is fed directly to operational amplifier 803. Operational amplifier 803 is connected to operate in the inverting mode with capacitors 805 and 807 and resistor 809 controlling the high-frequency response thereof for stability. Resistor 811 is chosen to control the gain of this stage of the summing circuit with DC power from a power supply not shown provided at inputs 813 and 815. The output from this stage of the summing circuit is added directly to the output of the even bus 802 through resistor 817. Since the output from the odd bus 801 has been inverted in the first summing stage such addition is made directly and may be coupled through resistor 816 and diodes 905 and 906 to the monitor output 17. The waveform appearing at monitor output 17 is shown in the top waveform of FIG. 6 as will be discussed more fully hereinafter.

The output from the even bus 802 together with the output from the first stage of the summing circuit are also applied to operational amplifier 804 of the second stage of the summing circuit. Operational amplifier 804 is also connected to operate in the inverting mode with capacitors 806 and 808 and resistor 810 controlling the high-frequency response of this stage for stability. DC power for the operation of this stage of the summing amplifier is provided from a power supply, not shown, at inputs 812 and 814 and the gain of this stage of the summing circuit is set by resistor 820. The output from this stage of the summing circuit is applied through resistor 816 to the third stage of the summing circuit. The third stage of the summing circuit consists of an operational amplifier 900 connected to operate in the inverting mode with unity gain. The circuitry associated with operational amplifier 900 includes diodes 901 and 902 connected to provide a full wave rectified output at the network consisting of resistor 903 and capacitor 904 and thus at the control output 18. Diodes 905 and 906 connected in parallel with each other in the feedback circuit of the second stage of the summing circuit and diodes 907 and 908 connected in parallel with each other in the feedback circuit of the third stage of the summing circuit insure that the full wave rectified output signal is a linear function of the AC input signal. Capacitors 910 and 911 and resistor 912 control the high-frequency response of the third stage of the summing circuit, with DC power for the operation of such third stage being provided from a power supply not shown at inputs 913 and 914. Resistors 915 and 916 control the gain of the third stage of the summing circuit and resistors 917 and 816 protect the operational amplifiers 900 and 804 respectively from the high charging currents of capacitor 904.

Referring to FIG. 6 the waveforms at outputs 17 and 18 are shown. It will be seen that the waveform at the monitor output 17 is a semilogarithmic sum of all of the outputs of amplifier stages $A_1$ through $A_6$ and the output of the preamplifier stage as taken through the odd and even buses described hereinabove. The waveform shown for the monitor output 17 in FIG. 6 assumes an input signal substantially as assumed in connection with FIG. 2. Thus the waveform at monitor output 17 converts the exponential decay of the input signal into a semilogarithmic decay by limiting the amplitude of the high-intensity portion of the signal and amplifying the low-intensity portion of the signal. It will be seen that when the input signal has decayed to an intensity below that required to overdrive the final amplifier stage $A_6$ the monitor output waveform will follow the exponential decay of the input signal. When applied to an appropriate display device the monitor output waveform will provide an instantaneous check on the presence or absence of interfering seismic signals at the associated geophone. It will be seen that any interfering signal of sufficient amplitude to have a deleterious effect will produce a substantial monitor output signal that can be easily detected and displayed.

As shown in FIG. 6 the waveform appearing at control output 18 is a full wave rectification of the monitor output 17 waveform. Because of the semilogarithmic decay of such full wave rectified signal at control output 18 the operation of the multiplexer may be accurately and reliably controlled in response to the exponential decay of the input signal. As shown, the waveform appearing at control output 18 provides a direct current voltage varying between 10 volts and approximately 2 volts at all times when a control function is performed. In other words, so long as the control voltage is greater than 10 volts the output of the system will be taken from the preamplifier. Similarly, so long as the control voltage is below about 2 volts the output from the system will be taken from the final amplifier $A_6$. Voltages intermediate 10 volts and approximately 2 volts will result in the selection of one of the amplifier stages $A_1$ to $A_5$ corresponding to such voltage. It will be understood that DC voltage variations of this magnitude may be readily digitized by known analog-to-digital converters, the digital output of which may be readily used to control known multiplexers and also may be readily recorded for use in reconstructing the input waveform.

As shown in FIG. 7 the contribution of the preamplifier and each of the amplifier stages $A_1$ through $A_6$ to the semilogarithmic monitor and control signals may be weighted by adjusting the relative values of resistors 68 and 130 through 630 as well as the gain of the buffer stage and the first and second summing stages. As shown in FIG. 7 such resistive values and gain characteristics are adjusted to produce monitor and control waveforms that approach a square wave. This will result in a decrease in the ripple of the full wave rectified control signal and will thus make it even more suitable for digitization.

It will be understood that embodiments of this invention are not limited to the specific arrangements of component parts as shown in FIGS. 3, 4 and 5 and described in detail hereinabove. Those skilled in the art will find it possible to make changes in such components in their arrangement without departing from the spirit and scope of this invention. Similarly the specific waveforms shown in FIGS. 2, 6 and 7 may be modified to suit the specific application for which the particular embodiment of this invention is designed. The power supply used to generate the DC voltages for operation of the specific embodiment disclosed herein should, of course, be well regulated and exhibit low drift characteristics with time and temperature changes.

I claim:

1. The method of amplifying an electrical input signal the amplitude of which varies over a given range with time comprising the steps of:

a. applying said input signal to the first of a plurality of stages of amplification connected in cascade and each having a fixed low-gain characteristic;

b. continuously sampling the output from selected ones of the cascaded stages of amplification and adding said outputs together to produce a combined control signal and c. maintaining the amplitude of the amplified electrical output signal within a range of variation narrower than said given range by taking said output signal from different ones of said cascaded stages of amplification at different times in response to the amplitude variation of the combined control signal, utilizing said combined signal to select the output of said cascaded amplifier stages taken for said amplified output signal.

2. The method of claim 1 including the step of limiting the maximum amplitude of the output of each of said cascaded stages of amplification to the same predetermined value.

3. The method of claim 2 wherein the output of said cascaded amplifier stages taken for said amplified output signal is that output of said cascaded amplifier stages having an unlimited maximum value nearest said predetermined value.

4. The method of claim 1 including the step of applying said combined signal to a display device for monitoring.

5. The method of claim 1 including the steps of taking a sample output from the first of said cascaded stages of amplification and adding said sample output to sample outputs taken from each subsequent odd numbered stage of amplification to produce a first combined signal, taking a sample output from the second of said cascaded stages of amplification and adding said sample output to sample outputs taken from each subsequent even stage of amplification to produce a second combined signal, shifting the phase of one of said combined signals by 180° and thereafter adding said first and second combined signals to produce said combined control signal.

6. The method of claim 1 including the step of subjecting said combined signal to full wave rectification prior to utilizing said combined signal to select the output of said cascaded amplifier stages taken for the amplified output signal.

7. The method of claim 1 including the step of filtering the output of the first of said plurality of stages of amplification to limit said output to a given frequency range.

8. Apparatus for amplifying an electrical input signal to provide an amplified electrical output signal comprising a plurality of amplifier stages connected in cascade and each having a fixed low-gain characteristic, means for limiting the maximum output of each of said plurality of amplifier stages to a given value, means including a multiplexer for taking an output from each of said cascaded amplifier stages, means including a control circuit for said multiplexer to cause said multiplexer to select for said amplified output signal the output of different ones of said plurality of amplifier stages at different times in response to amplitude variations in the output of said plurality of amplifier stages, and means for adding the outputs of selected ones of said plurality of amplifier stages together to produce a combined control signal and means for coupling said control signal to said control circuit.

9. Apparatus according to claim 8 including means coupling the output of the first of said plurality of stages of amplification and the outputs of each subsequent odd numbered one of said plurality of stages of amplification together to produce a first combined signal, means coupling the output of the second of said plurality of stages of amplification and the outputs of each subsequent even numbered ones of said plurality of stages of amplification together to produce a second combined signal, means coupling said first combined signal to said second combined signal which means shifts the phase of said first combined signal by 180°, whereby said first combined signal and said second combined signal are combined to produce a control signal, and means for coupling said control signal to said control circuit.

10. Apparatus of claim 9 including a display device and means coupling said control signal to said display device.

11. Apparatus of claim 10 wherein said means coupling said control signal to said control circuit includes means providing full wave rectification of said control signal.

12. Apparatus according to claim 8 wherein narrow band filter means are interposed between the first and second ones of said plurality of amplifier stages.

13. Apparatus according to claim 8 wherein a buffer amplifier having unity characteristic gain is interposed between the output of the first of said stages of amplification and said multiplexer.

14. Apparatus according to claim 8 wherein each of said plurality of stages of amplification comprises a solid-state operational amplifier connected to operate in their inverting mode of amplification.

15. Apparatus according to claim 14 wherein the second and each subsequent one of said plurality of stages of amplification provides a gain of 12 db.

16. Apparatus according to claim 15 wherein the first of said plurality of stages of amplification provides a gain of 24 db.

17. Apparatus according to claim 8 wherein said means for limiting the maximum output of each of said amplification stages includes a network comprising a pair of Zener diodes connected in series across a power supply, a pair of conventional diodes connected in series with each other and in parallel with said series connected Zener diodes, the output of an amplification stage being connected to the junction of said series connected Zener diodes, and a resistance means connected between the junction of said conventional diodes and ground.

18. Apparatus according to claim 17 wherein a pair of conventional diodes are connected with reversed polarity in parallel with each other between the common connection of said series connected conventional diodes and the input terminal of the associated amplification stage.

19. Apparatus for amplifying seismic signals comprising:

a plurality of amplifier stages connected in cascade, each stage having a fixed gain characteristic, with means for applying seismic signals to the first of such stages, means connected to receive continuously the outputs of a plurality of said amplifier stages and operative to add said outputs to produce a control signal in response to the magnitude of a summed combination of the outputs of such stages, means for selecting the output of only one of said cascaded amplifier stages as an output for the apparatus in response to said control signal whereby the output of different ones of the amplifier stages is used at different times according to amplitude variations in the seismic signals.

* * * * *